Figure 1:
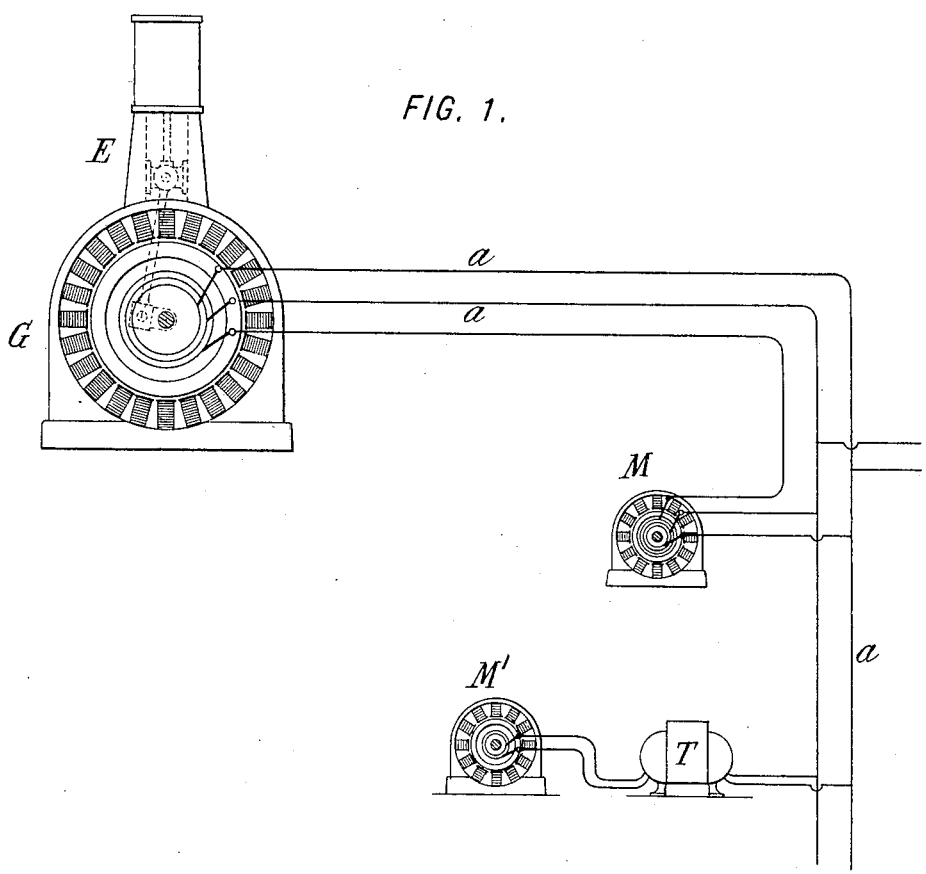

No. 707,389. Patented Aug. 19, 1902.
A. CHURCHWARD.
SYNCHRONOUS ALTERNATING CURRENT MOTOR.
(Application filed Oct. 1, 1898. Renewed May 1, 1901.)

(No Model.) 2 Sheets—Sheet 1.

WITNESSES:
Fred White,
Thomas F. Wallace

INVENTOR:
Alexander Churchward,
By his Attorneys,
Arthur C. Fraser & Co.

No. 707,389. Patented Aug. 19, 1902.
A. CHURCHWARD.
SYNCHRONOUS ALTERNATING CURRENT MOTOR.
(Application filed Oct. 1, 1898. Renewed May 1, 1901.)

(No Model.) 2 Sheets—Sheet 2.

WITNESSES:
Fred White
Thomas F. Wallace

INVENTOR:
Alexander Churchward,
By his Attorneys,
Arthur C. Fraser & Co.

THE NORRIS PETERS CO., PHOTO-LITHO., WASHINGTON, D. C.

UNITED STATES PATENT OFFICE.

ALEXANDER CHURCHWARD, OF FORT WAYNE, INDIANA.

SYNCHRONOUS ALTERNATING-CURRENT MOTOR.

SPECIFICATION forming part of Letters Patent No. 707,389, dated August 19, 1902.

Application filed October 1, 1898. Renewed May 1, 1901. Serial No. 58,364. (No model.)

*To all whom it may concern:*

Be it known that I, ALEXANDER CHURCHWARD, a citizen of the United States, residing at Fort Wayne, in the county of Allen and State of Indiana, have invented certain new and useful Improvements in Synchronous Alternating Motors, of which the following is a specification.

My invention relates to dynamo-electric machines, and principally to motors, in connection with which the invention will be described.

The object of this invention is to overcome the difficulties encountered in operating synchronous alternating-current dynamos, particularly motors, when the dynamo or generator supplying the motor fluctuates in speed in different parts of a revolution, as occurs when the generator is driven by an engine the propulsive thrust of which varies at different periods of each revolution.

It is commonly said that the speed of two alternating dynamos that are run in synchronism is definitely fixed by their relative numbers of field-poles, so that the two armatures make the same number of alternations per minute. It is in addition practically important that the two armatures maintain the same relative speed at all times. Thus if the generator is driven (by direct connection or otherwise) from an engine the speed of which varies at different parts of a revolution, so that the same variations in speed are communicated to the generator, and is connected in circuit with a second machine which runs at practically uniform speed (by having a very heavy fly-wheel or by its armature acting as a fly-wheel) it will follow that the phases of the two machines will be at times coincident, while at other times one machine may be in advance of or behind the other. The effect of a given difference of speed depends largely on its relation to the number of poles of the alternator. Thus, for example, the speed variation may be such that at one instant one armature is one-hundredth of a revolution in advance of the other, while at another instant it is an equal amount behind the other, and in such case if the machine have one hundred poles then the electromotive forces of the armatures will at one instant agree in phase, while at the next instant they will be of exactly wrong phase, with the result that a heavy current will flow through the machines. If, however, to take the contrary extreme case, the two alternators be two-pole machines, then an advance of only one-hundredth of a revolution of one armature relatively to the other will cause so trifling a difference in the electromotive forces as to produce little or no appreciable effect—that is to say, the effect is only one-fiftieth of that produced in the former case.

A sychronous motor tends to run at a uniform speed, since its revolving element acts as a fly-wheel. This tendency is especially marked when running under light load. If the generator speed fluctuates, its electromotive force will sometimes be in advance of and sometimes behind that of the motor, and the difference between the two will cause the current between the machines to fluctuate in strength, being at its minimum when the electromotive forces of the two machines are directly opposite in phase and in maximum when there is the greatest variation from this condition. A sychronous motor that is connected to a circuit on which the rapidity of alternation fluctuates at regular intervals tends to "pump"—that is, its armature runs sometimes a little faster and sometimes a little slower than the generator—with the result of causing a beating sound in the motor. Such pumping or beating action is usually indicative of some irregularity in the circuit feeding the motor. This irregularity may consist of variations either in speed or in electromotive force. The variation in speed of the generator tends to cause a corresponding variation in the speed of a sychronous motor. The motor cannot, however, assume instantly the speed required by the new speed of the generator. When the speed of the generator increases, the motor-armature begins to increase in speed; but by reason of its lagging the motor receives an increased current, because its armature is not in normal position for the new frequency and because additional current is required for supplying the energy necessary for increasing its speed. This additional current produces a difference of magnetism of the field, which must again be altered when the generator speed decreases below the average. The motor is therefore undergoing a slight variation in speed, which seeks to approximate to, but does not exactly correspond with, that of the generator. This pumping or rocking, however, will almost entirely disappear when even a small load is put on the motor. It has heretofore been the custom to weaken the field of a synchronous motor when it was found to pump. The effect of this is to lower the electromotive force of the motor, thereby putting an artificial load on the armature, which, however, while it reduces the pumping has the disadvantage of reducing the electromotive force of the generator and of upsetting the line. To overcome this defect and avoid interference with the line is the purpose of my invention.

According to this invention I apply on the shaft of the motor or on a shaft driven therefrom a fly-wheel of suitable weight, which instead of being fixedly connected to the motor in the usual manner is connected thereto through the medium of a yielding connection, which may be a frictional connection, but is preferably a spring connection, in which case the fly-wheel has such freedom of motion with reference to the armature that the latter can be moved from pole to pole without revolving the fly-wheel. The effect of this fly-wheel is to prevent the objectionable pumping action referred to. If the generator speed suddenly increases, the armature tends to correspondingly accelerate its speed, but the fly-wheel lags behind, thereby putting a slight load on the motor, and then when the generator slows down the motor-armature tends to run slower, while the fly-wheel tending to run at a uniform speed catches up with the motor-shaft and forces it ahead or resists its tendency to slow down, thereby again putting a slight load on the motor. I have already stated that putting a slight load on a synchronous motor extinguishes the pumping effect, this being equally true whether it is electrical, by weakening the field and taking extra current, or is mechanical, by throwing some additional work upon the motor. The yieldingly-connected fly-wheel provided by my invention is of the latter order and has the effect of causing the motor to run without any pumping. Inasmuch as the load imposed by the fly-wheel is felt only at the instants when the variation in speed occurs, its effect in correcting the pumping is accompanied by less loss of energy than with a load which imposes a continuous drag on the motor.

Having thus set forth the principle of my invention, I will now proceed to describe in detail the mode of applying the same with reference to the accompanying drawings, wherein—

Figure 2:
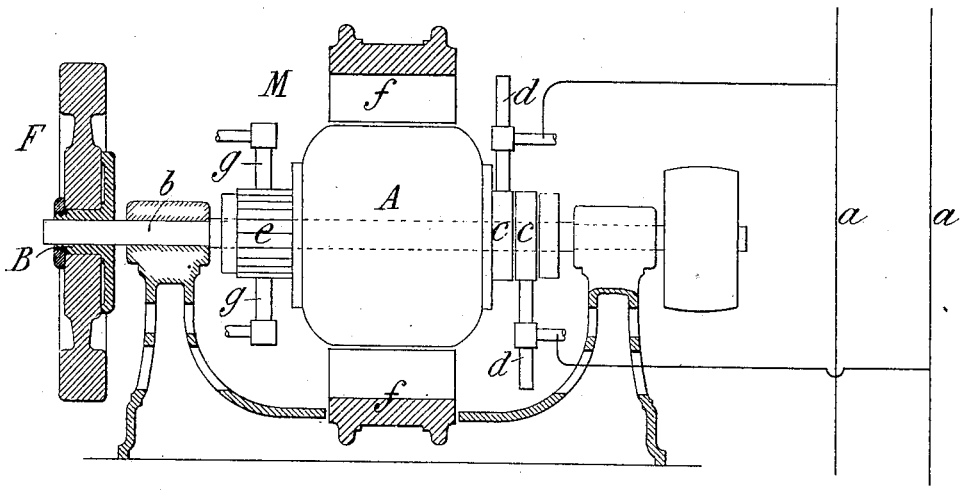
Figure 3:
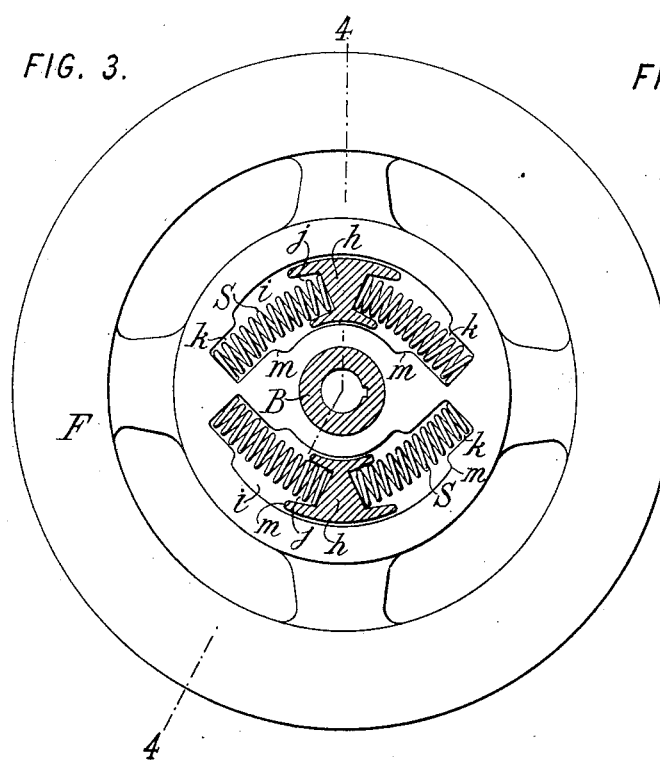
Figure 4:
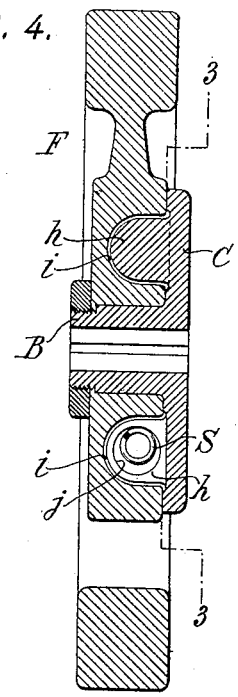
Figure 5:
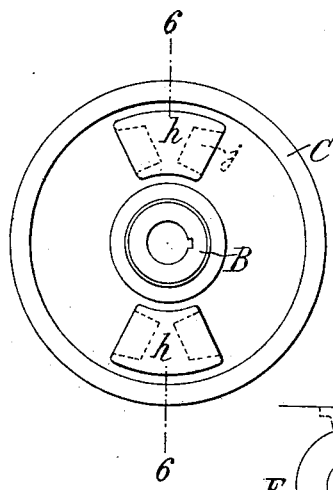
Figure 6:
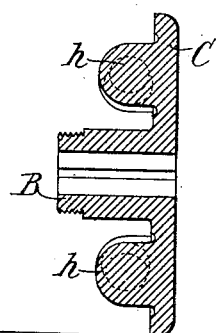
Figure 7:
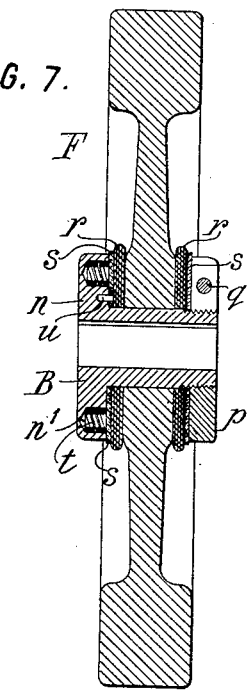
Figure 8:
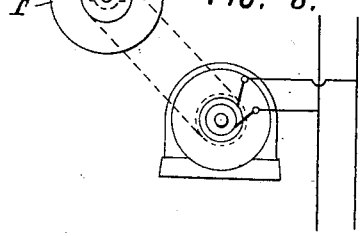

Figure 1 is a diagrammatic view showing the generator and motor and their circuit connections. Fig. 2 is a sectional elevation of the motor. Fig. 3 is a face view of the fly-wheel, showing the shaft-collar in section on the line 3 3 in Fig. 4. Fig. 4 is a transverse section of the fly-wheel and collar on the line 4 4 in Fig. 3. Fig. 5 is a face view of the collar, and Fig. 6 a transverse section thereof on the line 6 6 in Fig. 5. Fig. 7 is a diametrical section of a modified construction of fly-wheel. Fig. 8 is a diagrammatic elevation illustrating a modification.

According to Fig. 1, let G designate an alternating-current generator, (single or multi phase,) and $a$ $a$ the circuit fed therefrom. I have shown this generator as driven by a direct-connected steam-engine E. M and M' are synchronous motors. The motors may have the same number of poles as the generator or a different number, as is well understood. The motor M, I have shown as directly connected to the circuit $a$, while the motor M', I have shown as connected through a transformer T. To avoid complication in the diagram, I have not shown the means for exciting the field-magnets of the generator and motors and have also omitted all electrical accessories, such as starting-switches, &c.

In Fig. 2 I have shown an alternating motor of well-known type, of which $f$ is the field-magnet, A is the armature, $b$ is the armature-shaft, $c$ $c$ are the collector-rings, and $d$ $d$ are the brushes leading the alternating current into these rings. I have shown this machine as constructed with a commutator $e$ for feeding continuous current to brushes $g$ $g$ for the purpose of exciting the field-magnets; but these exciting connections not being material to my invention are not shown.

Referring to Fig. 2, on the armature-shaft $b$ (or any other shaft driven therefrom) is mounted a fly-wheel F. The preferred construction is that shown in Figs. 3 to 6, where the fly-wheel F is loosely mounted upon a sleeve B, which itself is keyed or otherwise fixed upon the shaft. Attached to the shaft is a collar C, which is preferably made in one piece with the sleeve B and which has one or more (preferably two) projections $h$ $h$. The fly-wheel has preferably two arc-shaped chambers $i$ $i$ for receiving these projections and for inclosing springs S S, preferably coiled or helical springs, as best shown in Fig. 3. The opposite ends of these springs are socketed in recesses $j$ and $k$, the former being formed in the projections $h$ and the latter being formed at the ends of the chambers $i$. The springs are arranged in one or more pairs, so as to afford elastic and resilient connections for resisting relative movement of the fly-wheel and shaft in either direction. The ends of the chambers $i$ are formed at the mouths of the sockets $k$ with projections or shoulders $m$, which constitute stops adapted to encounter the projections $h$ to limit the relative displacement of the fly-wheel and shaft. This displacement should be sufficient so that if the fly-wheel were held stationary the shaft could be turned enough to displace the armature from one field-pole to the next.

The stops limit the compression or stress which may be applied to the springs S S, and thereby prevent overstraining the springs.

My invention is not confined to the exact construction thus described, since any construction by which the fly-wheel is mounted to turn independently on the shaft and is connected thereto by a yielding or elastic connection adapted to resist movement of the fly-wheel relatively to the shaft will be within my invention. Any kind or arrangement of spring may be employed, it being understood that the springs may be arranged to act in either tension or compression or by torsion, or the springs may be simply yielding cushions.

Fig. 7 illustrates a modification embodying my invention. Here the yielding connection between the fly-wheel and shaft instead of being elastic is frictional. In effect the fly-wheel is mounted on the shaft through the medium of a friction-brake. The sleeve B is fixed on the shaft, as before described, and formed on one side with a flange or collar $n$, while its opposite end receives a detachable and adjustable collar $p$, connected, preferably, by screwing it upon the threaded end of the sleeve, the collar being split on one side and its split portion provided with a clamping-screw $q$, by which to contract the collar upon the screw-threads to lock it in place in a well-known manner. The hub of the fly-wheel F is confined between the collars $n$ and $p$, friction disks or washers $r$ $r$, preferably of rawhide, being placed against opposite faces of the hub and metal washers $s$ $s$ being preferably placed outside of these disks against the respective collars. The collar $n$ has a series of sockets $n'$, in which are confined stiff springs $t$ $t$, which tend to press the plate $s$ against the hub of the fly-wheel, and thereby generate a degree of friction between the fly-wheel and sleeve, the frictional retardation being adjustable by screwing up more or less the collar $p$. A pin $u$, entering a hole in the disk $r$, compels the latter to turn with the sleeve.

The construction last described enables the motor-shaft to turn independently of the fly-wheel, but resists this turning in either forward or backward direction to an extent dependent upon the amount of friction generated in the friction-brake, and it is the amount of this friction that determines the load that the fly-wheel imposes upon the motor. The power expended in overcoming this friction is of course lost, but as this loss occurs only when the fluctuations in speed occur instead of continuously, as when a mechanical load is put upon the motor, this loss is greatly reduced.

With the construction first described, where the yielding connection between the fly-wheel and shaft consists of springs, the load imposed during periods of speed variation is (in addition to unavoidable friction) proportional to the compression of the springs, and this compression during the period of lagging is given back by the expansion of the springs during a succeeding period of acceleration, so that the load necessary to suppress pumping is economized.

Instead of applying the fly-wheel directly on the motor-shaft it may be applied on any shaft driven by the motor. Thus in Fig. 8 I have shown the motor belted to a counter-shaft $b'$ and the fly-wheel F carried on this counter-shaft, the construction being otherwise exactly the same as before described.

Where a rotary transformer is used for converting an alternating to a direct current, there is some pumping action, as before described, and my invention is applicable in the same manner. Since such rotary transformer involves a synchronous motor as one of its elements, it will be understood that wherever such motor is herein referred to this element of a rotary transformer will be understood as included to the same effect as though in each instance I had referred to a "synchronous motor or rotary transformer."

It will be observed that I have provided a new combination wherein a rotating element is connected with the load through the agency of means that effects a yielding connection between the load and rotating element.

I claim as my invention the following-defined novel features, substantially as hereinbefore specified, namely:

1. The combination with a synchronous motor of a fly-wheel driven thereby through the medium of a yielding connection for producing the effect described.

2. The combination with a synchronous motor of a fly-wheel mounted on its shaft and driven thereby through the medium of a yielding connection.

3. The combination with a synchronous motor of a fly-wheel driven thereby, free to turn on its driving-shaft, and a yielding connection between such fly-wheel and the motor, for producing the effect described.

4. The combination with a synchronous motor of a fly-wheel driven thereby, free to turn on its driving-shaft, and springs interposed between the fly-wheel and shaft for producing the effect described.

5. The combination with a synchronous motor of a fly-wheel driven thereby, free to turn on its driving-shaft, a collar fixed to said shaft, and springs constituting a yielding connection between the fly-wheel and collar.

6. The combination with a synchronous motor of a fly-wheel driven thereby free to turn on its driving-shaft, a collar fixed to said shaft, springs constituting a yielding connection between the fly-wheel and collar, and a stop to limit the strain on said springs.

7. The combination with a synchronous motor of a fly-wheel F driven thereby, a collar C fixed on the driving-shaft and having projections $h$ $h$, and springs S S interposed between said projections and the fly-wheel.

8. The combination with a synchronous motor of a fly-wheel F driven thereby having arc-shaped chambers $i\ i$, a collar C fixed on the driving-shaft and having projections $h\ h$ projecting into said chambers, and springs S S interposed between said projections and the fly-wheel and inclosed in said chambers.

9. The combination with a synchronous motor of a fly-wheel F driven thereby, a collar C fixed on the driving-shaft and having projections $h\ h$, and springs S S interposed between said projections and the fly-wheel, and said fly-wheel and collar formed with mutually-abutting stops to limit the compression of said springs.

10. A synchronous motor and a load tending to maintain speed independently of the motor and coupled therewith by a yielding connection.

11. A synchronous motor and a load therefor tending to maintain speed independently of the motor and provided with means for affording a yielding engagement between the same and the said machine.

12. In a system of electrical distribution, the combination with a generator of alternating currents, of a motor supplied with current from the generator, a load for the motor tending to maintain speed independently of the motor, and means whereby the said load is yieldingly connected with the motor, substantially as described.

13. In a system of electrical distribution, the combination with a generator of alternating currents, of a motor supplied with current from the generator, a load for the motor tending to maintain speed independently of the motor, and spring mechanism whereby said load is yieldingly connected with the motor, substantially as described.

14. The combination with a synchronous dynamo-electric machine, of a fly-wheel driven thereby through the medium of a yielding connection, for producing the effect described.

15. The combination with a synchronous dynamo-electric machine, of a load operated thereby through the medium of a yielding connection, said load tending to maintain speed independently of the dynamo.

16. The combination with a rotary converter, of a fly-wheel driven thereby through the medium of a yielding connection for producing the effect described.

17. The combination with a rotary converter, of a load operated thereby through the medium of a yielding connection, said load tending to maintain speed independently of the converter.

In witness whereof I have hereunto signed my name in the presence of two subscribing witnesses.

ALEXANDER CHURCHWARD.

Witnesses:
CHARLES C. MILLER,
JAMES J. WOOD.